United States Patent
Fujii et al.

[11] Patent Number: 5,175,483
[45] Date of Patent: Dec. 29, 1992

[54] METHOD AND AN APPARATUS FOR COMPUTING MOMENT OF INERTIA IN A MOTOR SPEED CONTROLLER, AND A SPEED CONTROL METHOD AND APPARATUS FOR A MOTOR

[75] Inventors: Hiroshi Fujii, Chiba; Atsuhiko Nakamura, Funabashi; Takatsugu Kambara, Funabashi; Satoshi Ibori, Funabashi, all of Japan

[73] Assignee: Hitachi, Ltd., Tokyo, Japan

[21] Appl. No.: 763,144

[22] Filed: Sep. 20, 1991

[30] Foreign Application Priority Data

Sep. 21, 1990 [JP] Japan ................. 2-250203

[51] Int. Cl.$^5$ .................................... H02F 3/22
[52] U.S. Cl. .......................... 318/807; 318/799
[58] Field of Search ............ 318/3, 648, 807, 798, 318/799, 800-803; 388/903, 842, 847

[56] References Cited

U.S. PATENT DOCUMENTS 3,614,566 10/1971 Konig ..................... 318/648
4,827,197 5/1989 Giebler ..................... 318/3

FOREIGN PATENT DOCUMENTS

0262600 4/1988 European Pat. Off. .
59-156191 9/1984 Japan .
61-88780 5/1986 Japan .
2-32788 2/1990 Japan .

Primary Examiner—Stanley J. Witkowski
Assistant Examiner—John W. Cabeca
Attorney, Agent, or Firm—Antonelli, Terry, Stout & Kraus

[57] ABSTRACT

In a motor speed controller for controlling an AC motor to be driven at a variable speed, a signal proportional to a load torque and a signal proportional to an output torque of the AC motor are found by current detecting means for detecting the primary current of the AC motor, and integrated over the speed changing period, and the integrated values are divided by the values corresponding to the amounts of speed change during the speed changing period so that the moment of inertia can be computed. In addition, there is provided means for changing the rate of output frequency change caused by the output frequency command into a value according to the calculated moment of inertia. Moreover, there is provided a circuit for detecting a sudden change of the calculated moment of inertia, so that when a sudden change occurs, an abnormality signal is generated.

34 Claims, 8 Drawing Sheets

METHOD AND AN APPARATUS FOR COMPUTING MOMENT OF INERTIA IN A MOTOR SPEED CONTROLLER, AND A SPEED CONTROL METHOD AND APPARATUS FOR A MOTOR

BACKGROUND OF THE INVENTION

This invention relates to speed controllers for driving AC motors at variable speeds by the change of output frequency, and particularly to a moment-of-inertia detecting method and apparatus for automatically detecting a resultant moment of inertia of the AC motor and a load connected thereto, and a speed control method and apparatus for driving the an AC motor at the optimum acceleration or deceleration on the basis of the measured moment of inertia.

When an AC motor is driven at a variable speed by a speed controller, the torque upon change of speed is greatly changed by the moment of inertia of the load connected to the AC motor. Therefore, overcurrent may flow and the speed controller may be tripped unless the speed is changed in a manner allowing for the moment of inertia of the load.

A conventional method of computing moment of inertia is described in Japanese Patent Laid-open Gazette 61-88780. This method computes the moment of inertia from the integral of a torque proportional signal and the amount of change of revolution speed.

In this prior art, if the moment of inertia is found and the rate of change of speed is decided, operation without overcurrent and trip can be realized, but the speed of revolution must be detected. Thus, a speed detector is necessary. In addition, a is disclosed (see Japanese Patent Laid-open Gazette 59-156191). In this system, an induced electromotive force detector, generally not used, is necessary for the general-use inverter, thus causing the construction to be complicated and the cost to increase.

SUMMARY OF THE INVENTION

It is an object of the invention to detect a moment of inertia by use of a current detector which is widely used in the a motor speed controller for controlling an AC motor to be driven at a variable speed, particularly in a general-purpose inverter, and hence without use of a speed detector and a detector for induced electromotive force.

It is another object of the invention to provide an economical and highly reliable speed controller which enables an operation at a proper acceleration or deceleration rate according to the calculated moment of inertia.

It is still another object of the invention to provide a highly safe speed controller capable of automatic setting of accelerating or decelerating time and detecting an abnormal loading condition.

Thus, in order to achieve the above objects, according to this invention, there is provided a moment-of-inertia detecting apparatus in a motor speed controller for controlling an AC motor connected to a load to be driven at a variable speed in accordance with a speed command, comprising:

current detecting means for detecting a primary current of the AC motor; and moment-of-inertia detecting means for detecting a total moment of inertia of the AC motor and the load connected thereto on the basis of the amount of speed change of the AC motor at least in two respective operating conditions in which the rates of speed change are different, and the detected signals from the current detecting means in the respective operating conditions.

According to a preferred embodiment, there is provided a motor speed controller for controlling an AC motor connected to a load to be driven at a variable speed, comprising:

current detecting means for detecting a primary current of the AC motor;

first torque detecting means for detecting the torque of the AC motor at a constant speed on the basis of a current detected signal from the current detecting means;

a second torque detecting means for detecting the torque of the AC motor at a changing speed on the basis of a detected current signal from the current detecting means; and moment-of-inertia detecting means for receiving the detected signals from the first and second torque detecting means and detecting a total moment of inertia of the AC motor and the load connected thereto on the basis of the amount of speed change of the AC motor in the speed changing period.

According to another preferred embodiment, there is provided a moment-of-inertia detecting apparatus in a motor speed controller for controlling an AC motor connected to a load to be changed in the output frequency and driven at a variable speed in accordance with the speed command, comprising:

current detecting means for detecting a primary current of the AC motor;

means for changing the speed of the AC motor at least twice at different rates; and means for detecting a total moment of inertia of the AC motor and the load connected thereto from a mean value of the primary current of the AC motor and the rates of speed change during an accelerating period in which the speed is changed twice.

Moreover, there is provided means for changing the rates of speed change into a value according to the calculated moment of inertia.

Furthermore, there is provided the function for calculating the moment of inertia at each time of acceleration or deceleration, and for deciding the load to be abnormal when the calculated value is suddenly changed, and cutting off the output of the inverter.

Therefore, the total moment of inertia of the AC motor and the load connected thereto can be found without use of any detector other than the current detector. Also, since the maximum rate of speed change is changed into a value according to the previously found moment of inertia, the speed controller for the AC motor can be operated in the optimum condition without tripping. Moreover, the output of the inverter can be cut off when the moment of inertia is suddenly changed. Thus, the speed controller for the AC motor is simple in the construction, highly reliable, economical and highly safe.

DESCRIPTION OF THE PREFERRED EMBODIMENTS

Figure 3:
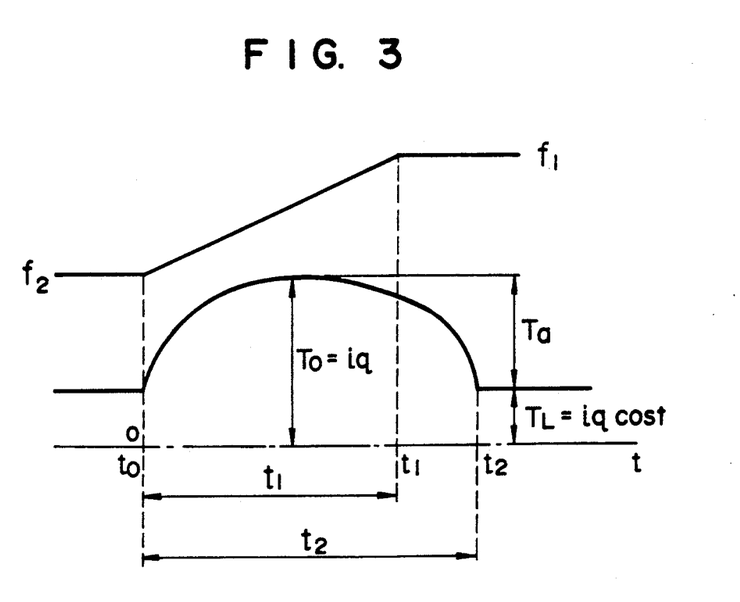
FIG. 3 is a timing chart for the torque change relative to the frequency change.

It is generally known that the total moment of inertia, $GD^2$ of a motor and a load on the motor is given by the following equation (1):

$$GD^2 = \frac{K_1 \left( \int_0^{t_2} T_0 dt - \int_0^{t_2} T_L dt \right)}{\Delta N} \quad (1)$$

where $T_0$ is the torque which the motor causes during accelerating (or decelerating), $K_1$ is a proportionality constant, $T_L$ is the torque of the load at a constant speed, $t_2$ is the time shown in FIG. 3, and $\Delta N$ is the amount of change of the revolution rate.

The amount of change of the revolution rate is given by the following equation (2).

$$\Delta N = \frac{120}{\text{pole number } P \text{ of motor}} \{(\text{frequency } f_1 \text{ after acceleration}) - (\text{frequency } f_2 \text{ before acceleration})\} \quad (2)$$

From equation (2), it will be seen that the amount of change of the revolution rate can be found from the amount of change of frequency which the inverter produces.

As illustrated in FIG. 3, when the motor is accelerated from time $t_0$, an acceleration torque $T_a$ is generated during the acceleration. The output torque $T_0$ is the sum of the load torque $T_L$ and the acceleration torque $T_a$. (see FIG. 3).

Therefore, if the motor is stopped from the accelerating, only the load torque $T_L$ remains, and thus the output torque is constant. The numerator of the equation (1) can be found by integrating the output torque and the load torque from time to when the acceleration starts to time $t_2$ when the output torque becomes constant, and subtracting the integral of the load torque from that of the output torque. The denominator of equation (1) is found from equation (2). As a result, the moment of inertia $GD^2$ can be calculated. Similarly, the moment of inertia upon deceleration can be calculated. Here, it is necessary to obtain a signal proportional to the output torque. If the inverter is of the vector control system, this signal can be easily obtained. However, since the conventional vector control system inverter employs a sensor which is not used by the general-use inverter, so as to determine the torque current component, there is the problem as described above. Therefore, only the output current detector which is used in the general-use inverter is used to produce the output current component by vector control, and the moment of inertia is found on the basis of the obtained torque current component. When the moment of inertia $GD_2$ is found, the acceleration time t can be calculated from the following equation (3):

$$t = \frac{GD_2 \times (\text{amount of change of speed } \Delta N)}{K_1 \times (\text{allowable output torque } T)} \quad (3)$$

If the inverter is operated on the basis of the acceleration time calculated from equation (3), optimum operation can be made without trip.

Figure 1:
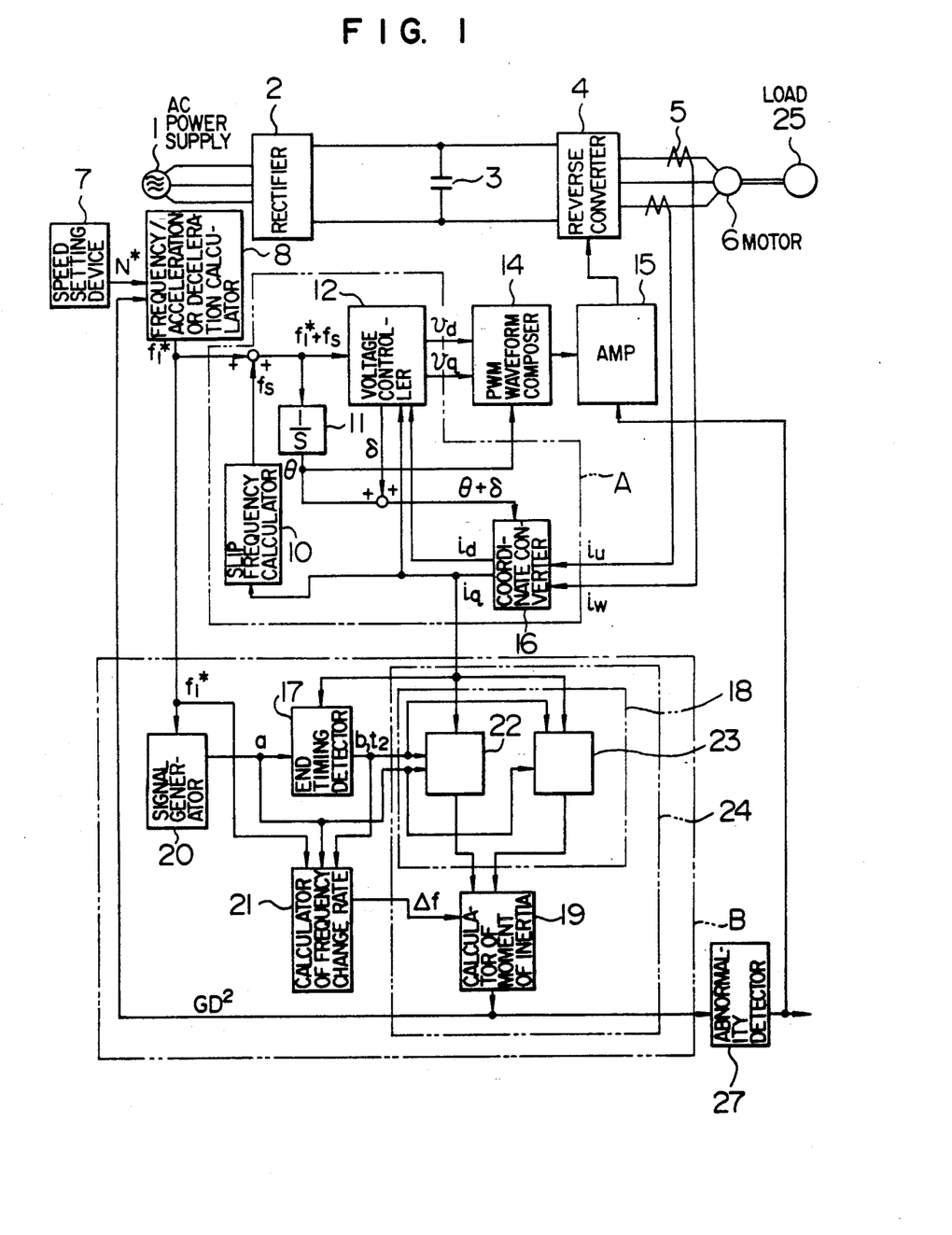
FIG. 1 is a block diagram of one embodiment of the invention.

An embodiment of the invention will be described with reference to the accompanying drawings. FIG. 1 shows the construction of this embodiment. The current from a three-phase AC power supply 1 is converted by a rectifying circuit 2 into a DC current. The DC current is smoothed by a smoothing capacitor 3, and then converted by a reverse converter 4 into an arbitrary AC voltage of an arbitrary frequency. This AC voltage is supplied to a motor 6. In this case, a voltage type inverter is used for controlling the AC motor to change the speed of revolution. That is, the reverse converter 4 is controlled by a logic section which is formed of a vector calculating portion A, a moment-of-inertia calculating portion B, a frequency acceleration or deceleration calculating portion 8 and a PWM waveform composer 14. Shown at 25 is a load. A voltage controller 12 outputs voltage commands Vd, Vq and an internal phase angle signal $\delta$ on the basis of a frequency command $f_1^* + f_s$, and currents id, iq. (For the operation of the vector calculating portion A, see Japanese Patent laid-open Gazette No. 2-32788.)

A coordinate converter 16 of the vector calculating portion A calculates a signal iq proportional to the output torque and a signal id proportional to the exciting current. The coordinate converter 16 makes d-q conversion from the following equation (4). The d-q coordinates are the rotating coordinates.

$$\begin{bmatrix} id \\ iq \end{bmatrix} = \begin{bmatrix} \cos(\theta + \delta), \sin(\theta + \delta) \\ -\sin(\theta + \delta), \cos(\theta + \delta) \end{bmatrix} \begin{bmatrix} iu \\ \frac{-(iu + 2iw)}{\sqrt{3}} \end{bmatrix} \quad (4)$$

If the phase of the output voltage $V_1$ from the inverter is represented by $\theta$, and the phase difference between the induced voltage $E_1$ of the motor and the output voltage $V_1$, or the internal phase angle is represented by $\delta$, then the internal phase angel 6 and the inverter output voltage $V_1$ are given by the following equations (5), (6).

$$\begin{aligned} V_1 &= Vd \cdot \sin(\delta) + Vq \cdot \cos(\delta) \\ &= (-\omega_r \cdot La \cdot iq + r_1 \cdot id)\sin(\delta) + \\ &\quad (E_1 + r_1 \cdot iq + \omega_r \cdot La \cdot id)\cos(\delta) \end{aligned} \quad (5)$$

$$\delta = \tan^{-1}\{-(\omega_r \cdot La \cdot iq + r_1 \cdot id)/(E_1 + r_1 \cdot iq + \omega_r \cdot La \cdot id)\} \quad (6)$$

Figure 2:
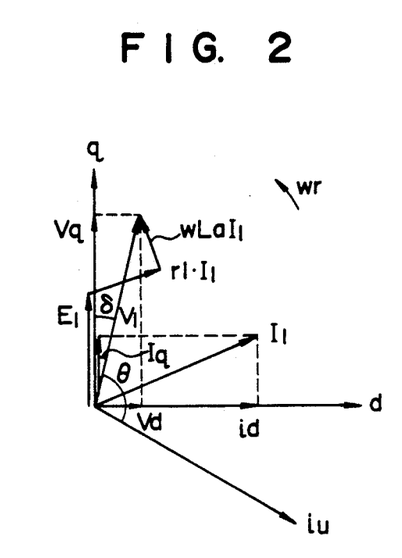
FIG. 2 is a vector diagram for a motor.

Where, $r_1$ is the primary resistor, and $L_a$ is the leakage reactance. The above relations are shown in the vector diagram of FIG. 2. From the vector diagram of FIG. 2, it will be understood that in the coordinate conversion, the q-axis is in phase with the induced voltage $E_1$, iq is the signal proportional to the torque and id is the signal proportional to the exciting current. Therefore, the output torque can be expressed by the value of iq. The primary voltage command $V_1$ in Eq. (5) is supplied to the PWM waveform composer 14, the output of which is fed through an amplifier 15 to a power switching element of the reverse converter 4.

The method of calculating the moment of inertia will be described below. Since the moments of inertia for acceleration and deceleration are similarly found, the description is made only for acceleration. The frequency acceleration or deceleration calculating portion 8 functions to change the frequency command $f_1^*$ at an arbitrary time and the rate of change of the frequency command $f_1^*$ depending on the magnitude of the moment of inertia. The moment-of-inertia calculating portion B is formed of a torque current integrator 18, an accelerating end timing detector 17, a moment-of-inertia calculator 19, an accelerating signal generator 20 and a frequency change rate calculator 21. The moment-of-inertia calculator 19 is operated at every certain time $\Delta t$ to execute the calculation. The accelerating signal generator 20 produces an accelerating signal a when the frequency is changed. The torque current integrator 18 starts operation when supplied with the accelerating signal a from the accelerating signal generator 20, and adds the torque proportional signal iq at every certain time $\Delta t$. The accelerating end timing detector 17 monitors the torque proportional signal iq when supplied with the accelerating signal a from the accelerating signal generator 20. It detects the time when the torque proportional signal iq has decreased and reached a constant value, or when the motor has reached a constant speed. When the torque proportional signal iq becomes constant, the end timing detector 17 supplies a signal b indicative of constant speed, to the torque current integrator 18, thus stopping the adding operation. Also, the end timing detector 17 measures the time $t_2$ from the accelerated state to constant speed of the motor and generates a signal $t_2$ indicative thereof. On the other hand, the frequency change rate calculator 21 calculates the change $\Delta f(=f_1-f_2)$ of the frequency $f_1^*$ during the period from the rising-up of the accelerating signal a to the accelerating end timing signal $t_2$, and supplies $\Delta f$ to the moment-of-inertia calculator 19.

The moment-of-inertia calculator 19 calculates equations (1) and (2) to find the moment of inertia $GD^2$.

The operation will be mentioned in detail with reference to FIG. 3. When a speed setting device 7 changes the frequency from $f_2$ to $f_1$, the frequency acceleration or deceleration calculating portion 8 increases the command frequency during the time $t_1$. Then, the motor starts to accelerate, and thus the load torque $T_L$ is added with the acceleration torque so that the output torque $T_0$ is produced. The torque current integrator 18 integrates the current iq proportional to this output torque $T_0$ relative to $\Delta t$. When the frequency command has reached $f_1$ after time $t_1$, the torque current detector 17 monitors the time when the torque current iq becomes constant (or only the load torque remains). This is because even if the output frequency of the inverter has reached $f_1$, the motor does not reach that frequency. When the torque current iq becomes constant, the time $t_2$ from the start of acceleration to constant speed is measured. The integration of the torque current iq during this time is given by the following equation (7)

$$K_1 \int_0^{t2} T_0 dt = K_4 \sum_0^{t2} iq \times \Delta t \tag{7}$$

On the other hand, the integration of only the load torque during the period of $t_2$ is given by the following equation (8):

$$K_1 \int_0^{t2} T_L dt = K_1 iq_{cost} \times t_2 \tag{8}$$

The amount of change of the revolution rate can be calculated from the following equation (9) since the command frequencies are known:

$$\Delta N = \frac{120}{P}(f_1 - f_2) \tag{9}$$

Therefore, the moment-of-inertia calculator portion 19 calculates the moment of inertia from equation (10) which is obtained by modifying equation (1).

$$GD^2 = \frac{K_4 \left( \sum_0^{t2} iq \times \Delta t - iq_{cost} \times t_2 \right)}{\frac{120}{P}(f_1 - f_2)} \tag{10}$$

Thus, the moment of inertia $GD^2$ can be found.

Figure 4:
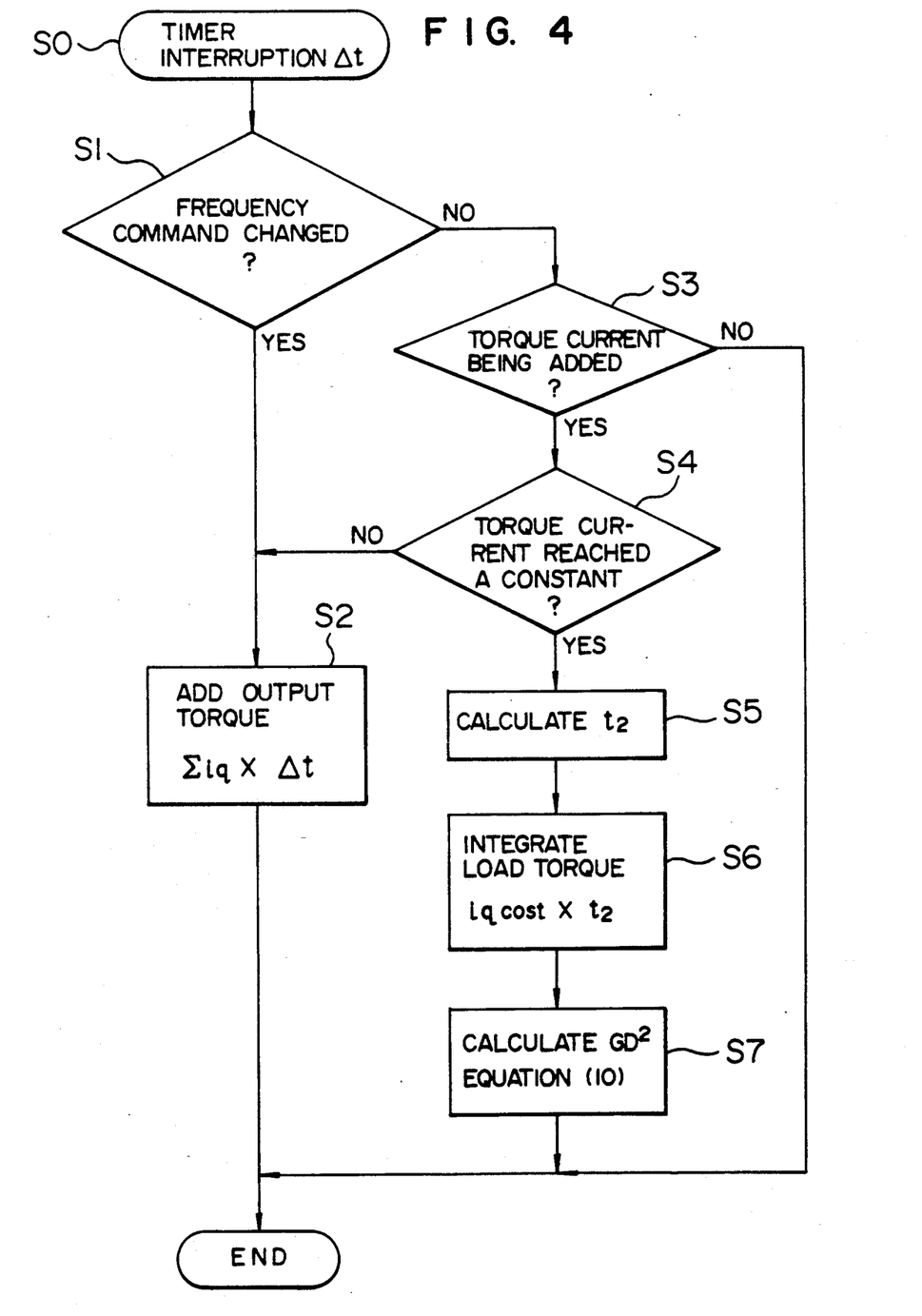
FIG. 4 is a flowchart for software for the embodiment of FIG. 1.

FIG. 4 shows the flowchart of the above operation. Use of software for this operation can be simply realized by the timer interruption of the flow shown in FIG. 4.

The operation will be described with reference to FIG. 4.

When the timer interruption is started at intervals of $\Delta t$, decision is made of whether the frequency command is changed or not (step S1).

When the frequency command $f_1^*$ is changed, the product of the torque current iq and $\Delta t$ is found (step S2).

During the time in which the frequency command is changing, $iq \times \Delta t$ is found and added to the previous value to produce $\Sigma iq \times \Delta t$ (-S0-S1-S2-S0-).

When the frequency change stops, the processing goes to step S3 where the torque current change is monitored (step S3, S4). Until the torque current becomes constant, the calculation of $\Sigma iq \times \Delta t$ at step S2 is continued (-S0-S1-S3-S4-S2-S0).

When the torque current becomes constant, $t_2$ is calculated (step S5) and the load torque $iq_{cost} \times t_2$ is calculated (step S6).

The moment of inertia is calculated from Eq. (10) by substituting $\Sigma iq \times \Delta t$ found at step S2 and $iq_{cost} \cdot t_2$ found at step S6 into Eq. (10) (step S7).

Figure 5:
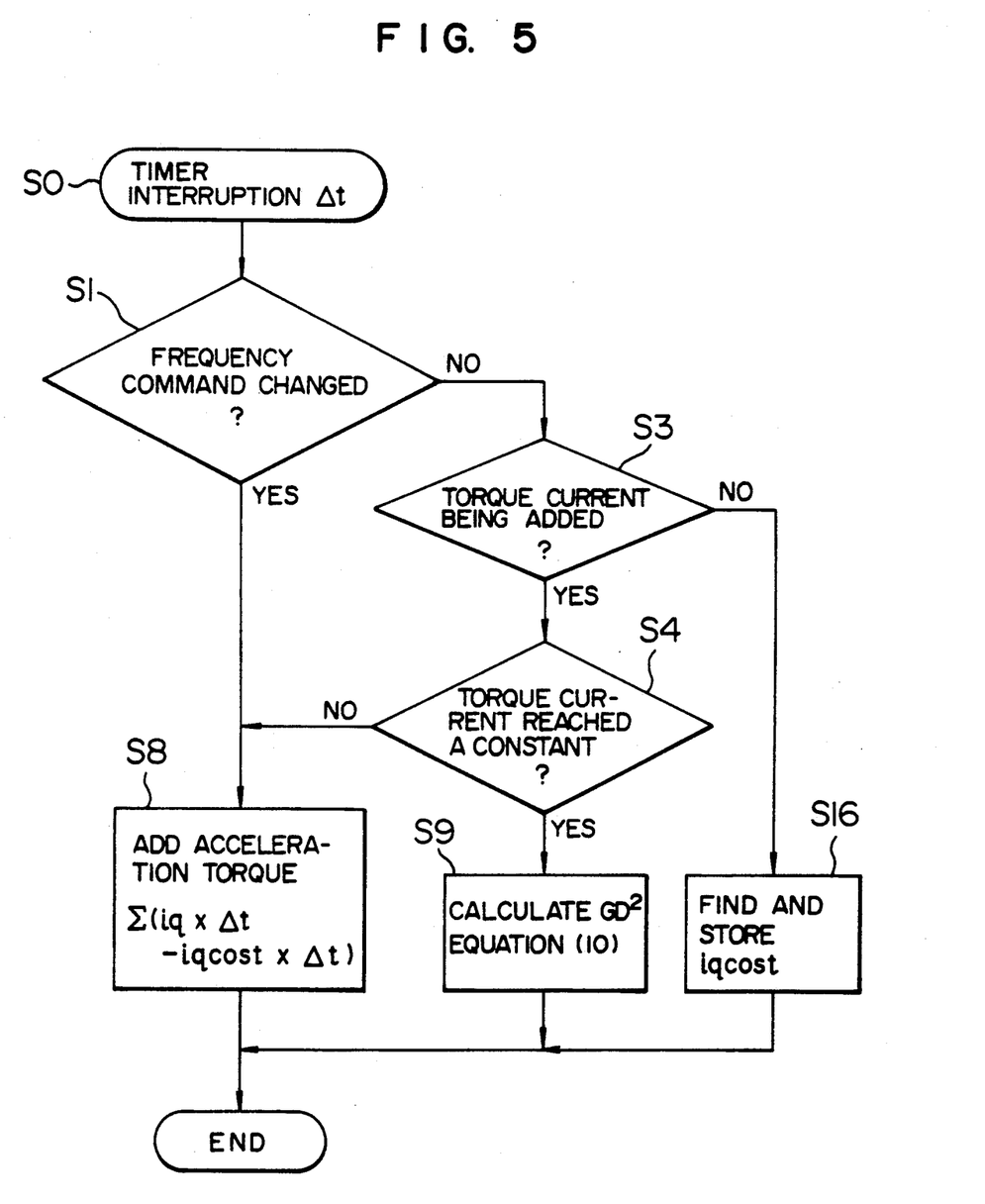
FIG. 5 is a flowchart for software in another embodiment of the invention.

While in this embodiment the output torque component $T_0$ and the load torque component $T_L$ are separately found from the start of acceleration to the end of acceleration, those components may be found at each sampling time. FIG. 5 is a flowchart for this operation. At step S8, $\Sigma(iq \times \Delta t - iq_{cost} \times \Delta t)$ is calculated. Therefore, in this embodiment, steps S5 and S6 in FIG. 4 can be omitted. In this case, the load torque proportional signal $iq_{cost}$ is found from the torque proportional signal at constant speed and stored at step S16. These operations are concerned with the technique of computation, and thus can be performed by various different methods. Since the moment of inertia can be found as above, the frequency acceleration or deceleration calculating portion 8 can determine the acceleration time for constant output torque $T_0$ from Eq. (3) on the basis of the found $GD^2$. This means that the motor can be accelerated or decelerated s that the primary current of the motor is a predetermined constant current value. If the output torque is not constant at this time, it is suggested that the moment of inertia of the load has changed. In this case, the acceleration or deceleration time is again set to a new value. Also, when the output torque is suddenly changed, it is decided that the load has become abnormal, and the inverter can be stopped. An abnormality detecting circuit 27 shown in FIG. 1 detects a sudden change of the moment of inertia and produces an abnormality signal AL. Moreover, the abnormality detecting circuit 27 supplies the abnormality signal AL to the amplifying circuit 15, stopping the operation of the speed controller.

While in this embodiment, the motor speed is assumed to having become constant from the fact that the output torque proportional signal iq becomes constant, the speed of revolution of the motor can always be detected by use of a slip frequency calculating portion 10 shown in FIG. 1. Since the current iq proportional to the output torque is known, the slip frequency fs is calculated from the equation (11):

$$fs = \frac{M}{2\pi T_2 \phi_2} iq \quad (11)$$

where $T_2$ is the secondary time constant, $\phi_2$ is the secondary magnetic flux, and M is the mutual inductance.

By use of this equation, it is possible to correct the frequency $f_1^*$ for fs and find the correct revolution rate of the motor. Thus, when the load torque $T_L$ varies at high and low speeds, the moment of inertia can be more precisely calculated.

Figure 6:
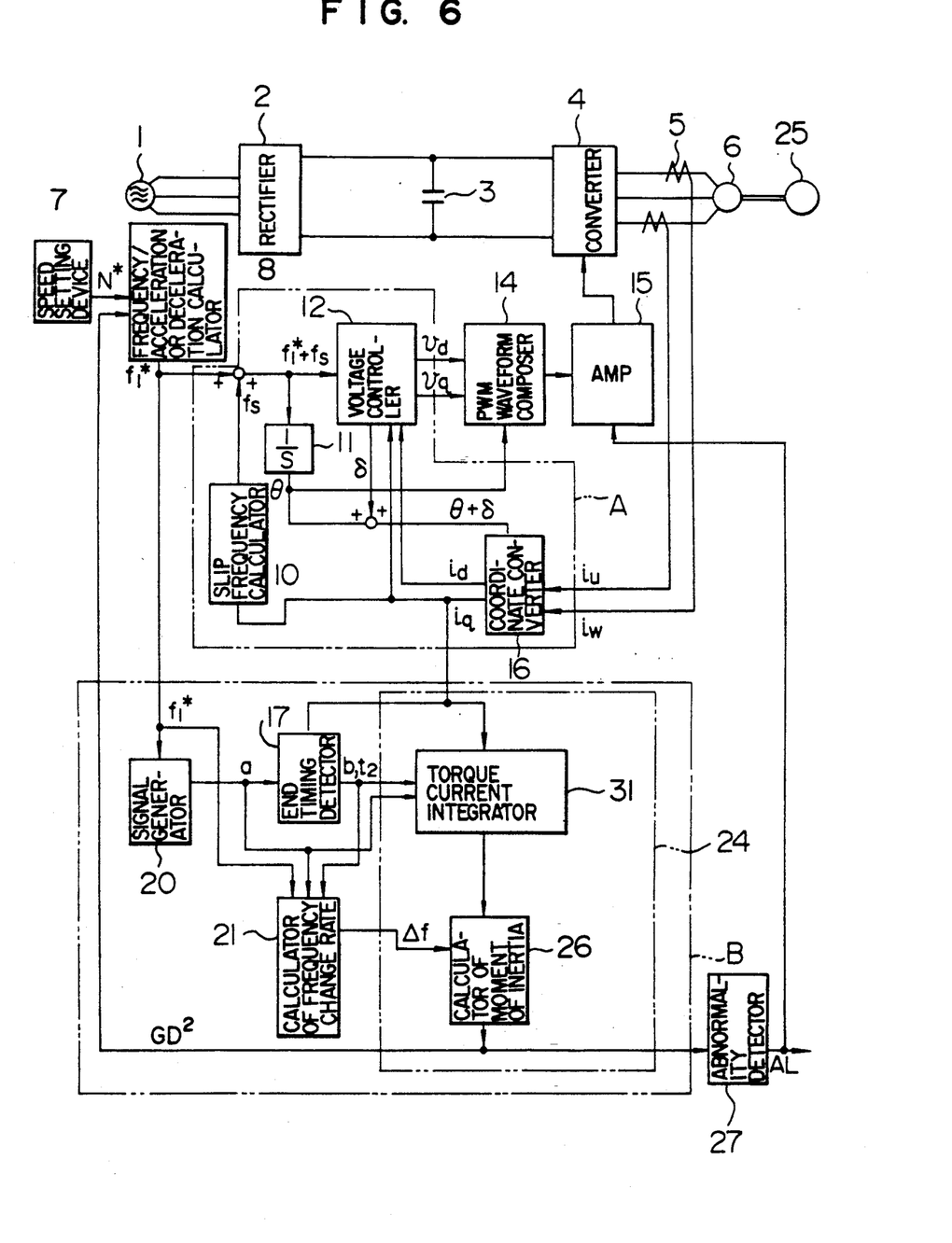
FIG. 6 is a block diagram of another embodiment of the invention.

FIG. 6 shows another embodiment. This embodiment is different from the embodiment of FIG. 1 in that a torque current integrator 31 and a moment-of-inertia calculator 26 have different constructions from those in the embodiment of FIG. 1. In other words, in FIG. 1, the torque current integrator 18 calculates the separate load torque component and output component and supplies them to the moment-of-inertia calculator 19, whereas in FIG. 6 the torque current integrator 31 calculates $\Sigma(iq \times \Delta t - iq_{cost} \times \Delta t)$ and supplies it to the moment-of-inertia calculator 26.

Figure 7:
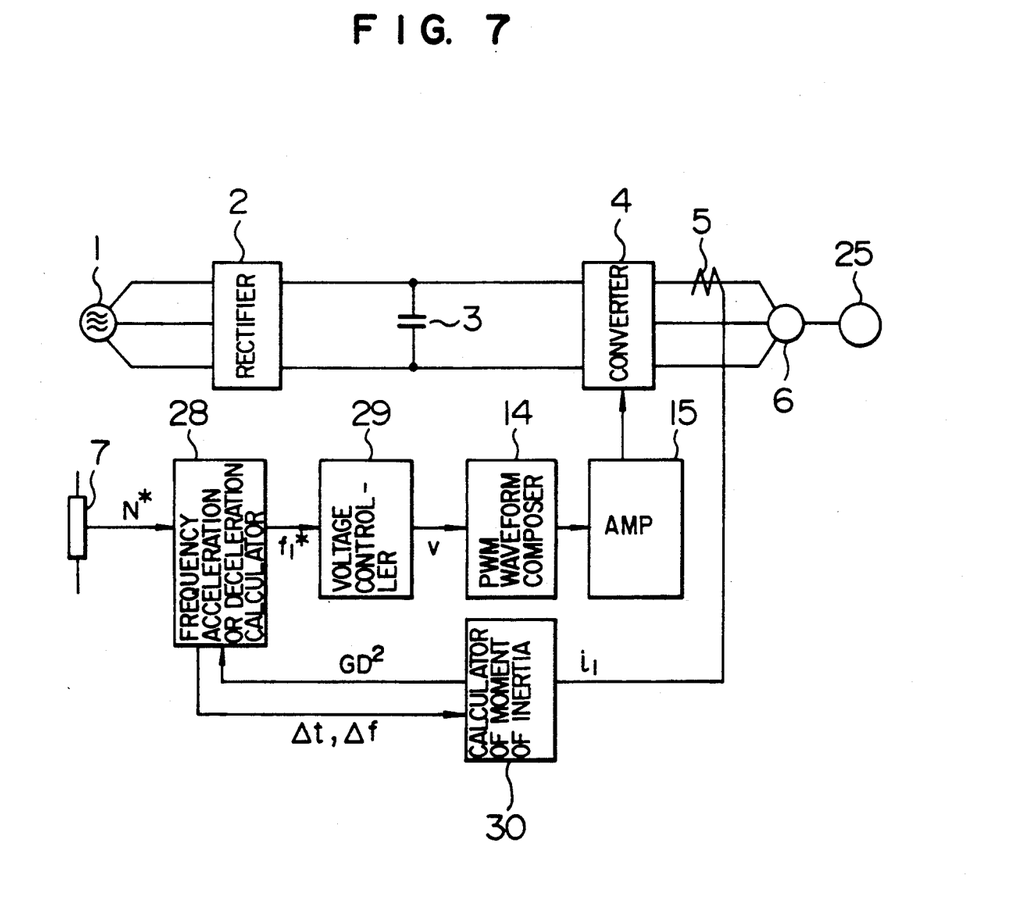
FIG. 7 is a block diagram of still another embodiment of the invention.

A description will be made of an application of the invention to a general-purpose inverter of the so-called V/F control system which is controlled so that the ratio between the output voltage and the output frequency is maintained to have a certain relation (see FIG. 7 for the operation).

In this case, when the frequency is changed twice and the term of the load torque $T_L$ is eliminated, the following equation (12) is satisfied:

$$GD^2 = \frac{K_2 \left( \frac{1}{\Delta t_1} \int_0^{\Delta t_1} T_1 dt - \frac{1}{\Delta t_2} \int_0^{\Delta t_2} T_2 dt \right)}{\left( \frac{\Delta f_1}{\Delta t_1} - \frac{\Delta f_2}{\Delta t_2} \right)} \quad (12)$$

$T_1, T_2 \ldots$ the first torque, second torque $\Delta f_1, \Delta f_2 \ldots$ the first and second amounts of frequency change $\Delta t_1, \Delta t_2 \ldots$ the first and second amounts of time change $K_2 \ldots$ the proportionality constant In the V/F control which is widely used for the general-purpose inverter, the component proportional to the torque cannot be directly measured. However, since the output torque ($T_1$, $T_2$) is approximately proportional to the primary current of the motor, $GD^2$ can be found from the measurement of the primary current as expressed by the equation (13):

$$GD^2 = \frac{K_3 \left( \frac{1}{\Delta t_1} \int_0^{\Delta t_1} I_{T1} dt - \frac{1}{\Delta t_2} \int_0^{\Delta t_2} I_{T2} dt \right)}{\left( \frac{\Delta f_1}{\Delta t_1} - \frac{\Delta f_2}{\Delta t_2} \right)} \quad (13)$$

$I_{T1}, I_{T2} \ldots$ the primary currents of the motor at time $T_1$, $T_2$ $K_3 \ldots$ the proportionality constant According to the equation (13), the moment of inertia can be found without knowing load torque $T_L$.

Figure 8:
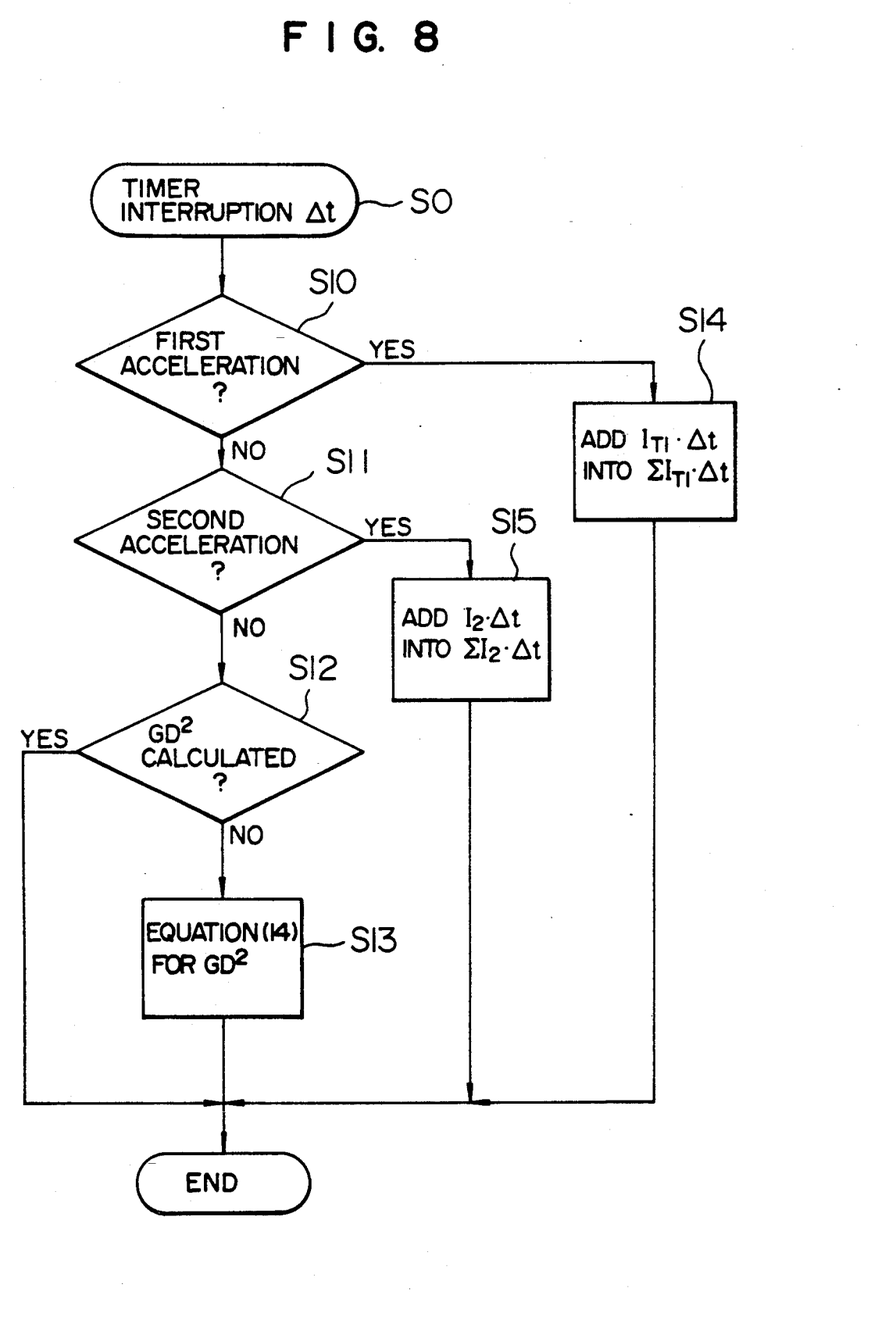
FIG. 8 is a flowchart for software for the construction of FIG. 7.
Figure 9:
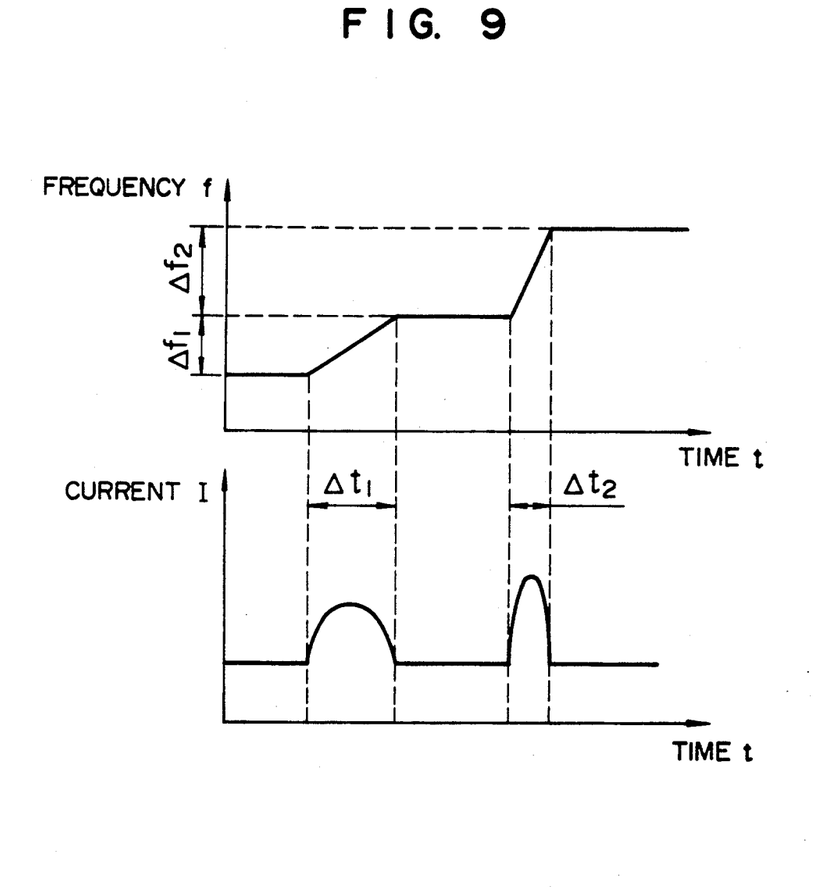
FIG. 9 is a timing chart for the operation of the embodiment of FIG. 7 in which the frequency is changed twice.

A method of finding the moment of inertia for the inverter of V/F control will be described with reference to FIGS. 7 to 9. In the V/F control, the vector current iq proportional to the torque cannot be known. The moment-of-inertia calculator 30 calculates the moment of inertia $GD^2$ from equation (12) by substituting three pieces of information: the motor primary current $i_1$ from the current detector 5, the amount of change of frequency $\Delta f$ from the frequency acceleration or decelerating calculator 28 and the amount of change of time $\Delta t$. In order to eliminate the term of load torque $T_L$, it is necessary that the frequency is necessary to be changed twice as described above. FIG. 8 is a flowchart for the operation, and FIG. 9 shows the change of frequency and current. The current is measured at each sampling time $\Delta t$, and integrated when the frequency is changed. If the frequency has been changed twice, the $GD^2$ is calculated from equation (14) which is a modification of Eq. (13).

$$GD^2 = \frac{K_3 \left( \frac{1}{\Delta t_1} \Sigma I_{T1} \Delta t - \frac{1}{\Delta t_2} \Sigma I_{T2} \Delta t \right)}{\left( \frac{\Delta f_1}{\Delta t_1} - \frac{\Delta f_2}{\Delta t_2} \right)} \quad (14)$$

To satisfy Eq. (14), acceleration is made twice for different rates of frequency change. The acceleration is not necessary to be a special accelerating operation for the moment of inertia, but may be a normal accelerating operation. Thus, the moment of inertia can be found at each accelerating operation except the first one. The decelerating operation may of course be a normal decelerating operation. Further, a voltage controllor portion 29 calculates and outputs an output voltage V on the basis of a V/f ratio predetermined by a frequency command f*.

According to this embodiment, since the torque proportional signal is approximated by the primary current, it will be known that the moment of inertia can be calculated. In this case, similarly the speed or induced electromotive force feed-back is not necessary, and the moment of inertia can be calculated. That is, there is the effect that it is possible to make the optimum accelerating and decelerating operation match with the load.

According to this invention, since the total moment of inertia of the motor and the load connected thereto can be automatically calculated by use of only a sensor which is generally used in a general-purpose inverter, the construction is not complicated. In addition, the motor can be accelerated or decelerated during the optimum time by use of the calculated moment of inertia If the moment of inertia is suddenly changed, it is decided that the load has caused an abnormality, and the inverter can be stopped; thus the safety is improved. Thus, the control apparatus for the motor is simple in construction, highly reliable, economical, and very safe.

What is claimed is:

1. A motor speed controller for controlling an AC motor connected to a load to be driven at a variable speed according to a speed command, said motor speed controller comprising:
   means for receiving a speed command;
   current detecting means for detecting a primary current of the AC motor and providing a current detection signal indicative thereof;
   speed change detecting means responsive to an amount of change of the speed command for detecting an amount of change of speed of the AC motor for each of at least two operating conditions of the AC motor in which the rates of speed change are different;
   speed changing period detecting means responsive to a change of speed command and to a change of the current detection signal for detecting a speed changing period; and
   moment-of-inertia detecting means responsive to the current detection signal, the amount of change of speed of the motor, and the speed changing period for detecting a total moment of inertia of the motor and the load.

2. A motor speed controller for controlling an AC motor connected to a load to be driven at a variable speed according to a speed command, said motor speed controller comprising:
   means for receiving a speed command;
   output frequency command changing means for providing an output frequency command and responsive to a change of the speed command to change the output frequency command;
   current detecting means for detecting a primary current of the AC motor and providing a current detection signal indicative thereof;
   frequency change detecting means responsive to an amount of change of the output frequency command for detecting an amount of change of output frequency for each of at least two operating conditions of the AC motor in which the rates of change of output frequency are different;
   speed changing period detecting means responsive to a change of the output frequency command and to a change of the current detection signal for detecting a speed changing period for each of the operating conditions; and
   moment-of-inertia detecting means responsive to the current detection signal and the amount of change of output frequency for detecting a total change of output frequency for detecting a total amount of inertia of the motor and the load.

3. A motor speed controller according to claim 2, wherein said frequency change detecting means detects the change of the output frequency for two operating conditions of either an accelerating or decelerating operating condition and a constant speed operating condition in which the rate of change of output frequency is zero.

4. A motor speed controller according to claim 2, wherein said frequency change detecting means detects the amount of change of output frequency for at least two accelerating or decelerating operating conditions in which the rates of change of output frequency are different.

5. A motor speed controller for controlling an AC motor connected to a load to be driven at a variable speed, said motor speed controller comprising:
   means for receiving a speed command;
   current detecting means for detecting a primary current of the AC motor and providing a current detection signal indicative thereof;
   speed change period detecting means responsive to a change of the speed command and to a change of the current detection signal for detecting a speed changing period when the speed of the AC motor is changing;
   first torque integrating means responsive to the current detection signal for providing a first integrated torque signal by integrating for the speed changing period a signal proportional to the torque of the AC motor at a constant speed;
   second torque integrating means responsive to the current detection signal for providing a second integrated torque signal by integrating for the speed changing period a signal proportional to the torque of the AC motor at a changing speed;
   frequency change detecting means responsive to an amount of change of the output frequency command for detecting an amount of change of output frequency during speed changing of the AC motor; and
   moment-of-inertia detecting means responsive to the first integrated torque signal, the second integrated torque signal, and the detected amount of change of output frequency for detecting a total moment of inertia of the motor and the load.

6. A motor speed controller for controlling an AC motor connected to a load to be driven at a variable speed according to a speed command, said motor speed controller comprising:
   means for receiving a speed command;
   current detecting means for detecting a primary current of the AC motor and providing a current detection signal indicative thereof;
   output frequency command changing means for providing an output frequency command and responsive to a change of the speed command for changing the output frequency command;
   current detecting means for detecting a primary current of the AC motor and providing a current detection signal indicative thereof;
   output frequency command changing means for providing an output frequency command and responsive to a change of the speed command for changing the output frequency command;
   speed change period detecting means responsive to a change of the output frequency command and to a change of the current detection signal for detecting a speed changing period when the speed of the AC motor is changing; and moment-of-inertia detecting means responsive to the current detection signal, the output frequency command, and the speed changing period for detecting a total moment of inertia of the motor and load.

7. A motor speed controller for controlling an AC motor connected to a load to be driven at a variable speed according to a speed command, said motor speed controller comprising:
   means for receiving a speed command;
   current detecting means for detecting a primary current of the AC motor and providing a current detection signal indicative thereof;
   output frequency command means responsive to the speed command for providing an output frequency command;
   output torque signal means responsive to the current detection signal and the output frequency command for providing an output torque signal proportional to the output torque of the AC motor;
   output frequency changing means responsive to a change of the output frequency command for providing an output frequency changing signal indicating that the output frequency is changing;
   speed change period detecting means responsive to the output frequency changing signal and the current detection signal for detecting a speed changing period when the speed of the AC motor is changing; and
   moment-of-inertia detecting means responsive to the output frequency command, the output torque signal, and the speed changing period for detecting a total amount of inertia of the AC motor and the load.

8. A motor speed controller according to claim 7, wherein:
   said speed change period detecting means includes acceleration end detecting means responsive to the output torque signal and the output frequency changing signal for detecting that the motor has reached a constant speed;
   said moment-of-inertia detecting means is further responsive to said acceleration end detecting means and the output frequency changing signal to detect the moment of inertia of the load 9. A motor speed controller for controlling an AC motor connected to a load to be driven at a variable speed according to a speed command, said motor speed controller comprising:
   current detecting means for detecting a primary current of the AC motor and providing a current detection signal;
   means for receiving a speed changing signal to change the speed of the motor at least two times at different rate of speed change;
   speed change period detecting means responsive to a change of the speed command and a change of the current detection signal for detecting a speed changing period; and
   moment-of-inertia detecting means responsive to the means value of the primary current of the AC motor and to the rate of speed change in speed changing periods corresponding respectively to the at least two changes of the speed of the motor for detecting a total moment of inertia of the AC motor and the load.

10. A motor speed controller for controlling an AC motor connected to a load to be driven at a variable speed according to an output frequency which changes in response to a speed command, said motor speed controller comprising:
    means for receiving a speed command;
    current detecting means for detecting a primary current of the AC motor and providing a current detection signal indicative thereof;
    means for changing the output frequency at least two times at different rates of frequency change;
    speed change period detecting means responsive to a change of the speed command and a change of the current detection signal for detecting a speed changing period;
    moment-of-inertia detecting means responsive to the means value of the primary current of the AC motor and to the rate of speed change in speed changing periods corresponding respectively to the at least two changes of the frequency for detecting a total moment of inertia of the AC motor and the load.

11. A motor speed controller for controlling an AC motor connected to a load to be driven at a variable speed according to an output frequency which changes in response to a speed command, said motor speed controller comprising:
    means for receiving a speed command;
    current detecting means for detecting a primary current of the AC motor and providing a current detection signal indicative thereof;
    speed change period detecting means responsive to a change of the speed command and a change of the current detection signal for detecting a speed changing period;
    moment-of-inertia detecting means responsive to the current detection signal, the amount of change of speed, and the speed changing period for detecting a total moment of inertia of the AC motor and the load; and
    means responsive to the maximum rate of speed change for providing a signal indicative of the detected moment of inertia.

12. A motor speed controller for controlling an AC motor connected to a load to be driven at a variable speed according to a speed command, said motor speed controller comprising:
    means for receiving a speed command;
    current detecting means for detecting a primary current of the AC motor and providing a current detection signal indicative thereof;
    output frequency command changing means for providing an output frequency command and responsive to a change of the speed command for changing the output frequency command;
    frequency change detecting means responsive to an amount of change of the output frequency command for detecting an amount of change of the output frequency under at least two operating conditions of the AC motor in which the rates of change of the output frequency are different;
    speed change period detecting means responsive to a change of the output frequency command and a change of the current detection signal for detecting a speed changing period for each of the operating conditions;
    moment-of-inertia detecting means responsive to the current detection signal and the amount of change of the output frequency for detecting a total moment of inertia of the AC motor and the load; and means responsive to the maximum rate of change of output frequency for providing a signal indicative of the detected moment of inertia.

13. A motor speed controller according to claim 12, wherein said frequency change detecting means detects the amount of said frequency change of the output frequency in two operating conditions, of either an accelerating or decelerating operating condition and a constant-speed operating condition in which the rate of change of output frequency is zero.

14. A motor speed controller according to claim 12, wherein said frequency change detecting means detects the amount of change of output frequency for at least two accelerating or decelerating operating conditions in which the rates of change of output frequency are different.

15. A motor speed controller for controlling an AC motor connected to a load to be driven at a variable speed, said motor speed controller comprising:
  means for receiving a speed command;
  current detecting means for detecting a primary current of the AC motor and providing a current detection signal indicative thereof;
  speed change period detecting means responsive to the change of the speed command and to a change of the current detection signal for detecting a speed changing period when the speed of the AC motor is changing;
  first torque integrating means responsive to the current detection signal for providing a first integrated torque signal by integrating for the speed changing period a signal proportional to the torque of the AC motor at a constant speed;
  second torque integrating means responsive to the current detection signal for providing a second integrated torque signal by integrating for the speed changing period a signal proportional to the torque of the AC motor at a changing speed;
  frequency change detecting means responsive to an amount of change of the output frequency command for detecting an amount of change of output frequency during speed changing of the AC motor;
  moment-of-inertia detecting means responsive to the first integrated torque signal, the second integrated torque signal, and the detected amount of change of output frequency for detecting a total moment of inertia of the motor and the load; and
  means responsive to the maximum rate of change of output frequency for providing a signal indicative of the detected moment of inertia.

16. A motor speed controller for controlling an AC motor connected to a load to be driven at a variable speed according to a speed command, said motor speed controller comprising:
  means for receiving a speed command;
  current detecting means for detecting a primary current of the AC motor and providing a current detection signal indicative thereof;
  output frequency command changing means for providing an output frequency command and responsive to a change of the speed command for changing the output frequency command;
  speed change period detecting means responsive to a change of the output frequency command and a change of the current detection signal for detecting a speed changing period when the speed of the AC motor is changing;
  moment-of-inertia detecting means responsive to the current detection signal, the output frequency command, and the speed changing period for detecting a total moment of inertia of the motor and the load; and
  means responsive to the maximum rate of change of output frequency for providing a signal indicative of the detected moment of inertia.

17. A motor speed controller for controlling an AC motor connected to a load to be driven at a variable speed according to a speed command, said motor speed controller comprising:
  means for receiving a speed command;
  current detecting means for detecting a primary current of the AC motor and providing a current detection signal indicative thereof;
  output frequency command means responsive to the speed command for providing an output frequency command;
  output torque signal means responsive to the current detection signal and the output frequency command for providing an output torque signal proportional to the output torque of the AC motor;
  output frequency changing means responsive to a change of the output frequency command for producing an output frequency changing signal indicating that the output frequency is changing;
  speed change period detecting means responsive to the output frequency changing signal and to the current detection signal for detecting a speed changing period when the speed of the AC motor is changing; and
  moment-of-inertia detecting means responsive to the output frequency command, the output torque signal, and the speed changing period for detecting a total moment of inertia of the AC motor and the load; and
  means responsive to the maximum rate of change of output frequency for providing a signal indicative of the detected moment of inertia.

18. A motor speed controller according to claim 17, wherein said speed change period detecting means includes acceleration end detecting means responsive to the output torque signal and the output frequency changing signal for detecting that the motor has reached a constant speed; and
  said moment-of inertia detecting means is further responsive to said acceleration end detecting means and the output frequency changing signal to detect a moment of inertia of the load.

19. A motor speed controller for controlling an AC motor connected to a load to be driven at a variable speed according to a speed command, said motor speed controller comprising:
  current detecting means for detecting a primary current of the AC motor and providing a current detection signal;
  means for receiving a speed changing signal to change the speed of the motor at least two times at different rates of speed change;
  speed change period detecting means responsive to a change of the speed command and a change of the current detection signal for detecting a speed changing period;
  moment-of-inertia detecting means responsive to the means value of the primary current of the AC motor and to the rate of speed change in speed changing periods corresponding respectively to the at least two changes of the speed of the motor for detecting a total moment of inertia of the AC motor and the load; and means responsive to the maximum rate of change of speed for providing a signal indicative of the detected moment of inertia.

20. A motor speed controller for controlling an AC motor connected to a load to be driven at a variable speed according to an output frequency which changes in response to a speed command, said motor speed controller comprising:

means for receiving a speed command;

current detecting means for detecting a primary current of the AC motor and providing a current detection signal indicative thereof;

means for changing the output frequency at least two times at different rates of frequency change;

speed change period detecting means responsive to a change of the speed command and a change of the current detection signal for detecting a speed changing period;

moment-of-inertia detecting means responsive to the mean value of the primary current of the AC motor and to the rate of speed change in speed changing periods corresponding respectively to the at least two changes of the frequency for detecting a total moment of inertia of the AC motor and the load; and means responsive to the maximum rate of change of output frequency for providing a signal indicative of the detected moment of inertia.

21. A motor speed controller for controlling an AC motor connected to a load to be driven at a variable speed, said motor speed controller comprising:

means for receiving a speed command;

current detecting means for detecting a primary current of the AC motor and providing a current detection signal indicative thereof;

speed change period detecting means responsive to the change of the speed command and to a change of the current detection signal for detecting a speed changing period;

speed change amount detecting means responsive to the amount of change of the speed command for detecting an amount of speed change of the AC motor;

first torque detecting means responsive to the current detection signal for detecting the torque of the AC motor at a constant speed;

second torque detecting means responsive to the current detection signal for detecting the torque of the AC motor at a changing speed; and moment-of-inertia detecting means responsive to the torque detected by said first torque detecting means, the torque detected by said second torque detecting means, the speed changing period, and the amount of speed change for detecting a total amount of inertia of the AC motor and the load.

22. A motor speed controller for controlling an AC motor connected to a load to be driven at a variable speed, said motor speed controller comprising:

means for receiving a speed command;

current detecting means for detecting a primary current of the AC motor and providing a current detection signal indicative thereof;

speed change period detecting means responsive to a change of the speed command and to a change of the current detection signal for detecting a speed changing period;

speed change amount detecting means responsive to the amount of change of the speed command for detecting an amount of speed change of the AC motor;

first torque detecting means responsive to the current detection signal for detecting the torque of the AC motor at a constant speed;

second torque detecting means responsive to the current detection signal for detecting the torque of the AC motor at a changing speed;

moment-of-inertia detecting means responsive to the torque detected by said first torque detecting means, the torque detected by said second torque detecting means, the speed changing period, and the amount of speed change for detecting a total amount of inertia of the AC motor and the load; and means responsive to the maximum rate of change of output frequency for providing a signal indicative of the detected moment of inertia.

23. A method of detecting a moment of inertia of a load of an AC motor to control the AC motor by changing an output frequency and driving the AC motor at a variable speed in accordance with a speed command, said method comprising:

(a) integrating an output torque proportional signal obtained from the primary current of the AC motor during a speed changing period from the start of a speed change to the end of the speed change;

(b) integrating a load torque proportional signal obtained from the primary current of the AC motor during the speed change period; and (c) detecting a total amount of inertia of the AC motor and the load from the difference between the integrated value obtained in step (a) and the integrated value obtained in step (b), and the change of speed during the speed changing period.

24. A method of detecting a moment of inertia of a load of an AC motor to control the AC motor by changing an output frequency and driving the AC motor at a variable speed in accordance with a speed command, said method comprising:

(a) detecting a load torque proportional signal obtained from the primary current of the AC motor and storing said load torque proportional signal;

(b) obtaining the product of an output torque proportional signal obtained from the primary current of the AC motor and a detection sampling time;

(c) obtaining the product of the load torque proportional signal and said detection sampling time;

(d) obtaining the difference between the value produced in step (b) and the value produced in step (c);

(e) repeating steps (b)-(d) at another detection sampling time until the primary current of the AC motor becomes constant, and obtaining the sum of the value produced in step (d) and the value produced in step (d) of the most recent previous detection sampling time;

(f) detecting that the primary current of the AC motor has become constant; and (g) detecting a total moment of inertia of the AC motor and the load on the basis of the amount of speed change in the speed changing period and the value produced in step (e) after it is detected in step (f) that the primary current of the AC motor has become constant.

25. A method of detecting a moment of inertia of a load of an AC motor to control the AC motor by changing an output frequency and driving the AC motor at a variable speed in accordance with a speed command, said method comprising:
   (a) detecting a load torque proportional signal obtained from the primary current of the AC motor and storing said load torque proportional signal;
   (b) obtaining the difference between an output torque proportional signal obtained from the primary current of the AC motor and said load torque proportional signal;
   (c) obtaining the product of the value produced in step (b) and a detection sampling time;
   (d) repeating steps (b) and (c) at another detection sampling time until the primary current of the AC motor becomes constant, and obtaining the sum of the value produced in step (c) and the value produced in step (c) of the most recent previous detection sampling time;
   (e) detecting that the primary current of the AC motor has become constant; and
   (f) detecting a total moment of inertia of the AC motor and the load on the basis of the amount of speed change in the speed changing period and the value produced in step (d) after it is detected in step (e) that the primary current of the AC motor has become constant.

26. A method of detecting a moment of inertial of a load of an AC motor to control the AC motor by changing an output frequency and driving the AC motor at a variable speed in accordance with a speed command, said method comprising:
   (a) detecting a first change of revolution rate;
   (b) adding the product of a primary current and a sampling time when the change of revolution rate is detected in step (a);
   (c) detecting a second change of revolution rate;
   (d) adding the product of the primary current and the sampling time when the change of revolution rate is detected in step (c); and
   (e) detecting a moment of inertia when no change of revolution rate is detected in step (a) and step (e).

27. A method of controlling an AC motor connected to a load by changing an output frequency and driving the AC motor at a variable speed in accordance with a speed command, said method comprising:
   (a) integrating an output torque proportional signal obtained from the primary current of the AC motor during a speed change period from the start of a speed change to the end of the speed change;
   (b) integrating a load torque proportional signal obtained from the primary current of the AC motor during the speed change period;
   (c) detecting a total moment of inertial of the AC motor and the load from the difference between the integrated values obtained in steps (a) and (b) and the speed change during the speed changing period; and
   (d) changing the maximum rate of output frequency change caused by the output frequency command into a value according to the detected moment of inertial.

28. A method of controlling an AC motor connected to a load by changing an output frequency and driving the AC motor at a variable speed in accordance with a speed command, said method comprising:
   (a) detecting a load torque proportional signal obtained from the primary current of the AC motor and storing the load torque proportional signal;
   (b) obtaining the product of an output torque proportional signal obtained from the primary current of the AC motor and a detection sampling time;
   (c) obtaining the product of said load torque proportional signal and said detection sampling time;
   (d) obtaining the difference between the value produced in step (b) and the value produced in step (c);
   (e) repeating steps (b)–(d) at another sampling time until the primary current of the AC motor becomes constant, and obtaining the sum of the value produced in step (d) and the value produced in step (d) of the most recent previous detection sampling time;
   (f) detecting that the primary current of the AC motor has become constant;
   (g) detecting a total moment of inertia of the AC motor and the load on the basis of the amount of speed change in the speed changing period and the value produced in step (e) after it is detected in step (f) that the primary current of the AC motor has become constant; and
   (h) changing the maximum rate of output frequency change caused by the output frequency command into a value according to the detected moment of inertia.

29. A method of controlling an AC motor connected to a load by changing an output frequency and driving the AC motor at a variable speed in accordance with a speed command, said method comprising:
   (a) detecting a load torque proportional signal obtained from the primary current of the AC motor and storing said load torque proportional signal;
   (b) obtaining the difference between an output torque proportional signal obtained from the primary current of the AC motor and the load torque proportional signal;
   (c) obtaining the product of the value obtained in step (b) and a detection sampling time;
   (d) repeating steps (b) and (c) at another sampling time until the primary current of the AC motor becomes constant, and obtaining the sum of the value produced in step (c) and the value produced in step (c) of the most recent previous detection sampling time;
   (e) detecting that the primary current of the AC motor has become constant;
   (f) detecting a total moment of inertia of the AC motor and the load on the basis of the amount of speed change in the speed changing period and the value produced in step (d) after it is detected in step (e) that the primary current of the AC motor has become constant; and
   (g) changing the maximum rate of output frequency change caused by the output frequency command into a value according to the detected moment of inertia.

30. A method of controlling an AC motor connected to a load by changing the output frequency and driving the AC motor at a variable speed in accordance with a speed command, said method comprising:
   (a) detecting a first change of revolution rate;

(b) adding the product of a primary current and a sampling time when the change of revolution rate is detected in step (a);

(c) detecting a second change of revolution rate;

(d) adding the product of the primary current and the sampling time when the change of revolution rate is detected in step (c);

(e) detecting a moment of inertia when no change of revolution rate is detected in step (a) and step (b); and (f) changing the maximum rate of output frequency caused by the output frequency command into a value according to the detected moment of inertia.

31. A motor speed controller according to any one of claims 12 to 18, further comprising means for detecting a sudden change of the moment of inertia detected at each time of acceleration or deceleration and for producing an abnormality of signal.

32. A motor speed controller according to any one of claims 12 to 18, further comprising means for detecting a sudden change of the moment of inertia detected at each time of acceleration or deceleration and for cutting of operation of said motor speed controller.

33. A motor speed controller according to any one of claims 1, 2, 6, 7, 8, 10, 11, 12, 13, 14, 17, 18, 19, 21, or 22 further comprising control means responsive to the detected moment of inertia for controlling the speed of the AC motor.

34. A method according to any one of claims 31 to 28, further comprising controlling the speed of the AC motor on the basis of the detected moment of inertia.

* * * * *